Nov. 22, 1966   O. B. SHERMAN   3,286,303
MACHINE FOR FORMING HOLLOW PLASTIC ARTICLES
Filed Oct. 29, 1963
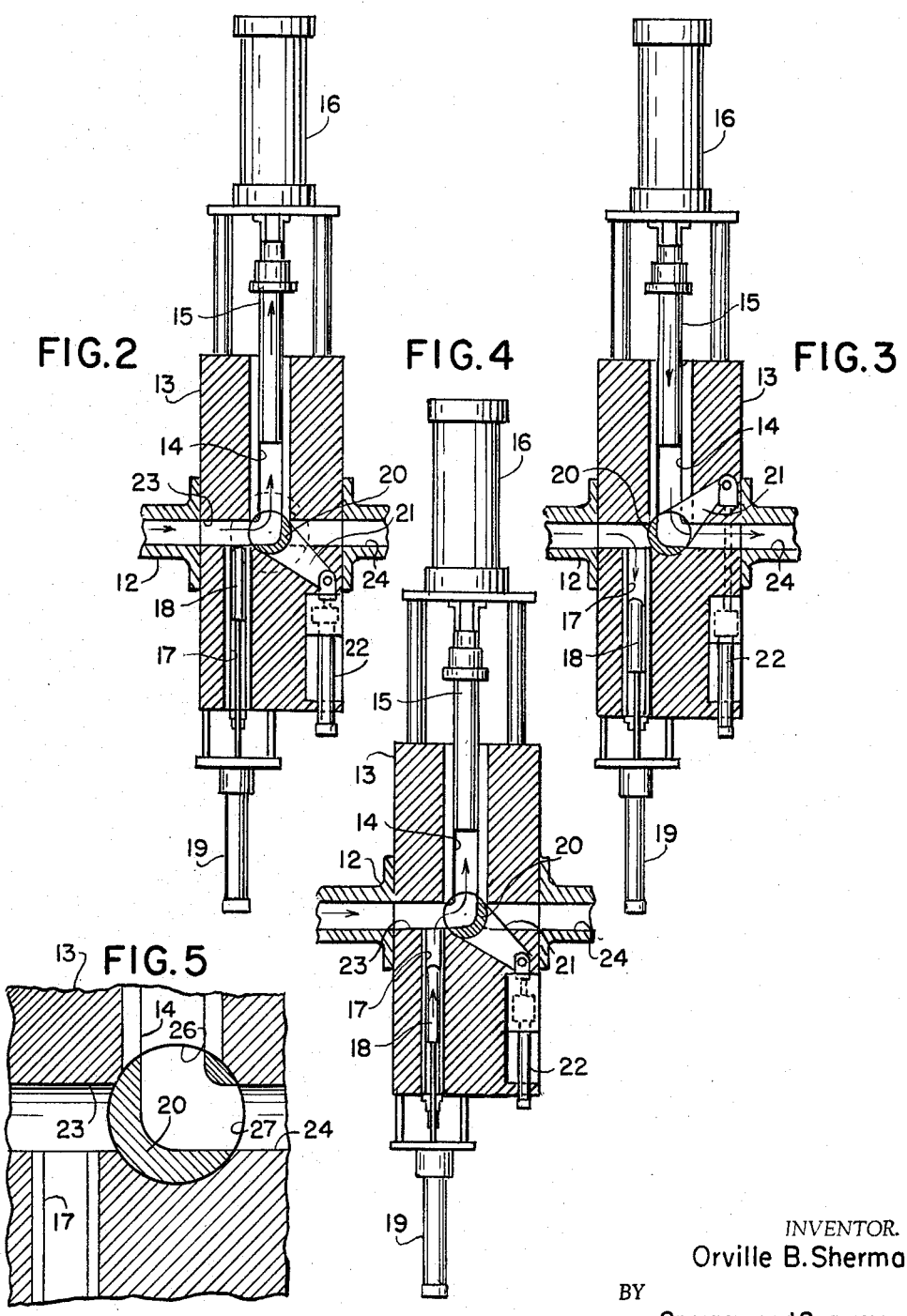
INVENTOR.
Orville B. Sherman
BY
Sparrow and Sparrow
ATTORNEYS.

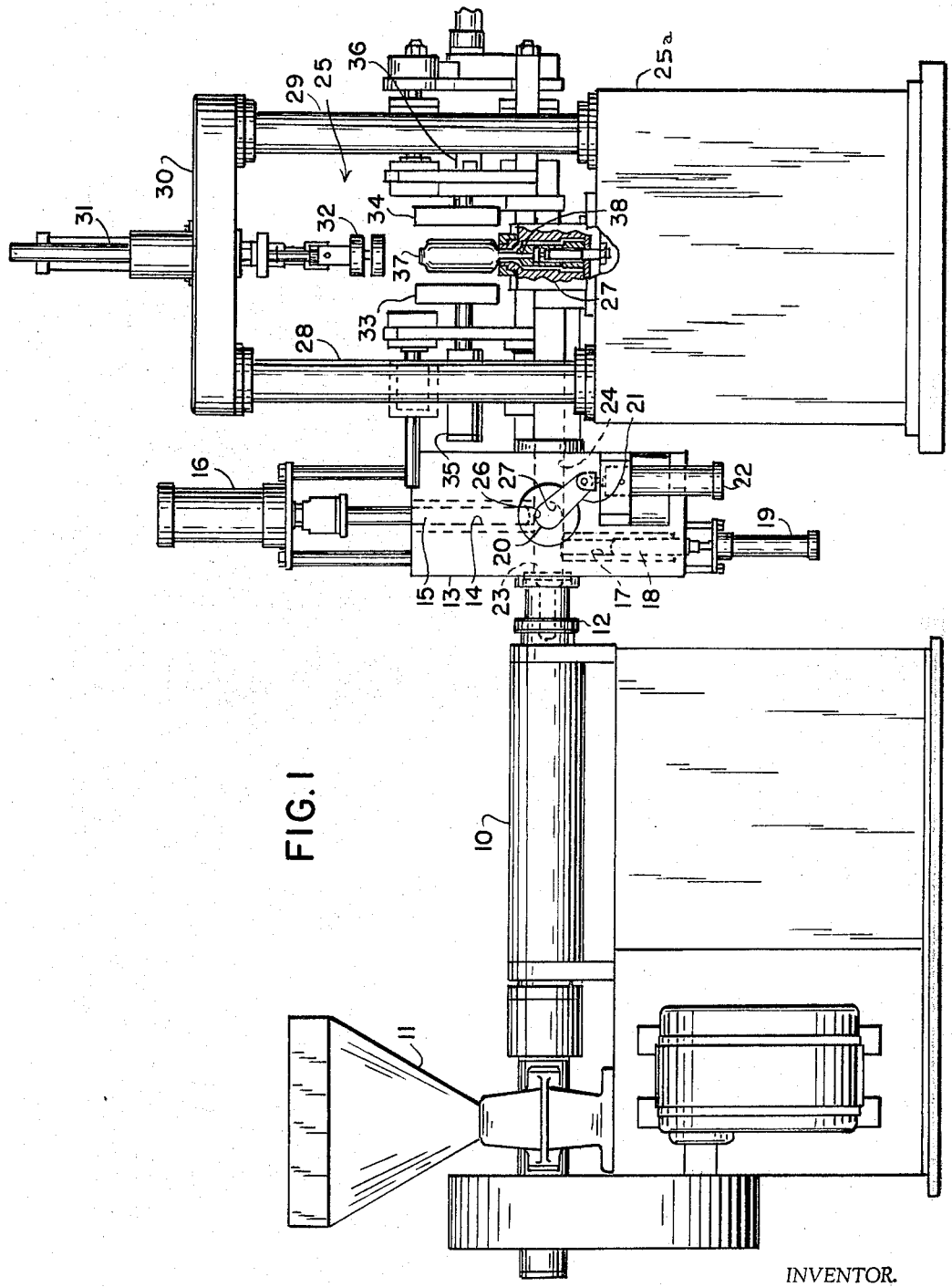

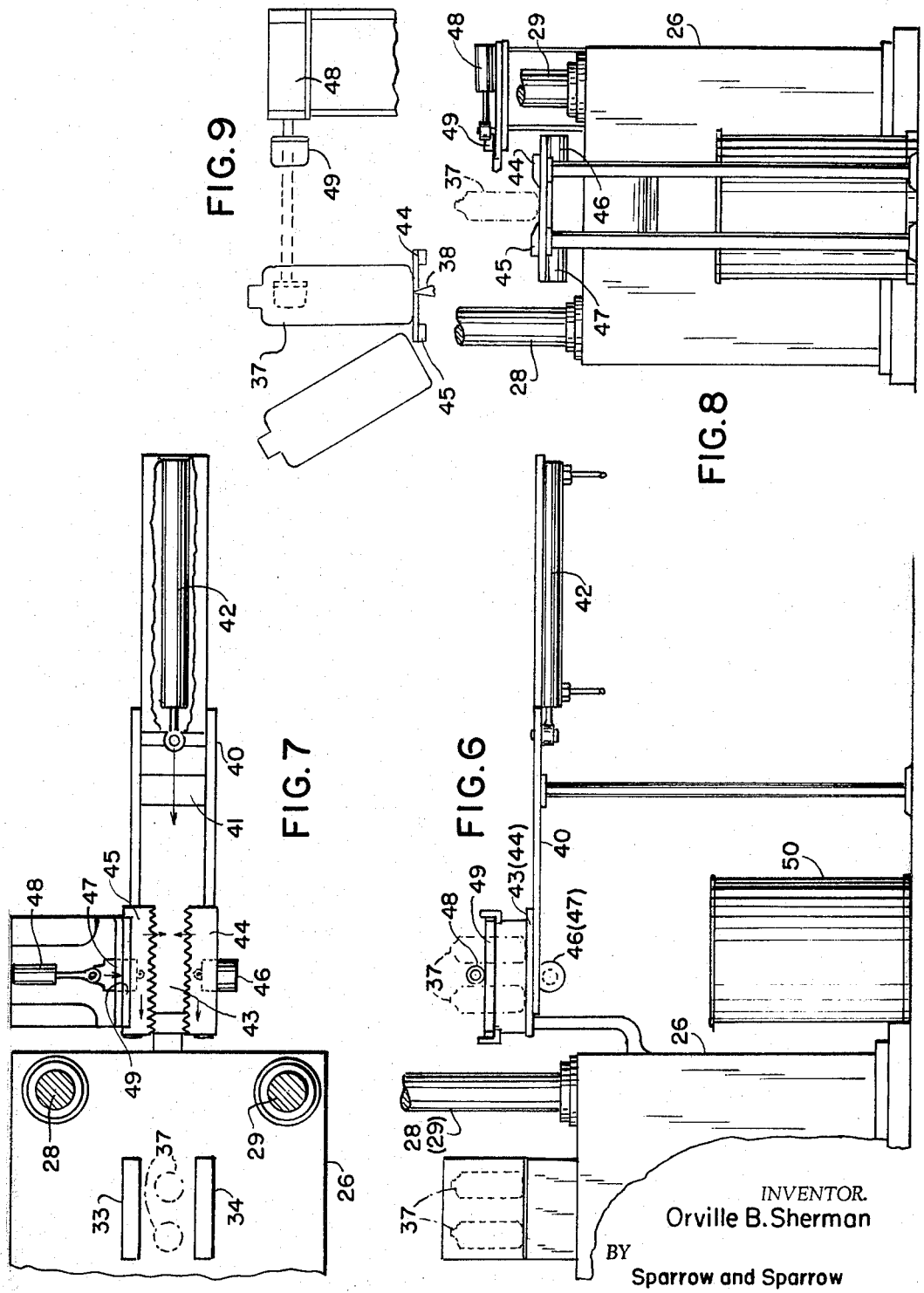

United States Patent Office 3,286,303
Patented Nov. 22, 1966

3,286,303
MACHINE FOR FORMING HOLLOW
PLASTIC ARTICLES
Orville B. Sherman, Ho-Ho-Kus, N.J., assignor, by mesne assignments, to National Bottle Corp., Ardmore, Pa., a corporation of Illinois
Filed Oct. 29, 1963, Ser. No. 319,839
12 Claims. (Cl. 18—5)

This invention relates to machines for forming hollow plastic articles by the extrusion and blow-molding process, and in particular, to improvements in such machines.

Generally, machines of this kind comprise two groups, that is, extruding machines in which the plastic material is plasticized under heat and pressure, and blow-molding machines into which the pre-plasticized material is being fed in extruded form by the extruder, and in which subsequently the plastic hollow article is being given its final shape by blowing.

Obviously, the extruder is by its very nature a continuously operating machine, whereas the blow-molding machine works intermittently. Receivers and intermediate feeding devices have been designed for overcoming the difference between the two working principles; however, these existing devices have not been too successful and have been sources of trouble. There are basically two groups: one which uses hydraulically operated receivers and pistons therein which alternately receive and inject the material into the molding machine, and another one which also receives the material and injects it, but re-circulates the preplasticized material.

In the first group are devices which operate with two separate high-pressure receivers. Between these two receivers which alternate in receiving and discharging is a switch valve providing the necessary timed connections between the extruder, the receiver and the molding press. This rotatable valve has to operate continuously under high pressure on one side and practically under no pressure on the other side. Sealing has been found to be one major problem, scoring of the rotatable body another disadvantage. From the production point of view, the operation is still intermittent.

In the second group are devices which have more or less involved valve mechanisms which do not prove to be susceptible to a continued production without consistent maintenance. Besides, the plastic material to be processed has the characteristics of discoloring and even breaking down; in other words, of decomposing within a few minutes after it has been released from the extruder.

This invention distinguishes itself from the known principles by avoiding both the separate high-pressure receivers and the re-circulating devices and constitutes a definite improvement in view of both machine design and machine operation.

The invention consists in such novel features, construction arrangements, combinations of parts and improvements as may be shown and described in connection with the apparatus herein disclosed by way of example only and as illustrative of a preferred embodiment. Objects and advantages of the invention will be set forth in part hereafter and in part will be obvious herefrom or may be learned by practicing the invention, the same being realized and attained by means of the instrumentalities and combinations pointed out in the appended claims.

It is a general object of this invention to provide contrivances for extruding plastic material through an orifice into a blow-molding press without building up a back pressure against the extruder.

It is a further object of this invention to provide means for intermittently receiving pre-plasticized material without subjecting it to high pressures.

Another object of the invention is to provide a combination of blow pressure cylinder, high pressure cylinder and switch valve in such manner that no back pressure from the high-pressure cylinder can be fed back into the low-pressure system.

Various further and more specific purposes, features and advantages will clearly appear from the detailed description given below taken in connection with the accompanying drawings which form part of this specification and illustrate merely by way of example one embodiment of the device of the invention. In the following description and in the claims, parts will be identified by specific names for convenience, but such names are intended to be as generic in their application to similar parts as the art will permit. Like reference characters denote like parts in the several figures of the drawings, in which:

FIG. 1 shows an overall side view of the plastic forming machine, according to the invention;

FIGS. 2, 3 and 4 illustrate the phases of the operation of the accumulator between the extruder and the blow-molding press;

FIG. 5 is a cross-section of the valve;

FIG. 6 is a side elevation of the delivery end of the plastic forming machine;

FIG. 7 is a plan view of the delivery end;

FIG. 8 is an end view of the delivery end; and

FIG. 9 shows schematically the separation of the molded piece from the tail.

Referring now in more detail to the drawings illustrating a preferred embodiment by which the invention may be realized, there is in FIG. 1 a conventional extruder 10 having a hopper 11 for receiving the powdered raw material on one end thereof and a discharge connection 12 on the other end.

This connection 12 leads into the main body 13 of an accumulator. Within accumulator 13 is a cylindrical bore 14 in which a piston 15 is operated by a hydraulic cylinder 16. Piston 15 is adapted to operate at high pressure, for example, in the range of approximately 5,000 p.s.i. A second cylindrical bore 17 is arranged in the main body 13, in which a second piston 18 is operated by a separate hydraulic cylinder 19. This second piston 18 is adapted to operate at low pressure, for example, in the range of approximately 1,000 p.s.i. Centrally arranged in main body 13 is a rotatable valve 20 which has a lever 21 connecting same to a hydraulic cylinder 22. A conduit 23 in main body 13 leads to valve 20 and another conduit 24 leads to the extrusion die (not shown in the drawing) of the blow-molding press 25. Valve 20 has two orifices 26 and 27 which are arranged at a right angle to one another. The low-pressure bore 17 and piston 18 are arranged between connection 12 and valve 20 and is directly connected with conduit 23.

Cylinders 16 and 19 are connected to the hydraulic system in such manner that permits hydraulic pressure to be applied only on the forward stroke of pistons 15 and 18. The pistons are not retracted by the cylinders 16 and 19 but are returned by the pressure of plastic material being delivered from the extruder. Thus, the only back pressure against the extruder is the slight frictional pressure encountered in returning the pistons 15 and 18. This method prevents any pocket of air space in the bores 14, 17, 23 and 24, and insures a solid body of plastic ahead of the pistons at all times.

The blow-molding press 25 comprises foundation 25a on which molding block 27 is mounted. Two columns 28, 29 support head portion 30 in which hydraulic cylinder 31 for withdrawal of molding head 32 is located. Arranged on molding block 27 are the mold halves 33, 34 of the mold, which can be moved by hydraulic cylinders 35, 36 for closing and opening of the mold. After the molding operation has been completed, the molded body 37 is still held in position by excess material comprising the flash or tailpiece 38 depending therefrom.

Referring now to FIGS. 6, 7, 8 and 9 of the drawings, there is shown in more detail, mechanism for the removal of the molded pieces. Adjacent molding press 25 is a table or stand 40 on which a slide 41 is moved by a long-stroke hydraulic cylinder 42. On the forward end 43 of slide 41 there are arranged two serrated jaws 44, 45 which are moved perpendicularly to the slide 41 by two hydraulic cylinders 46, 47. Another hydraulic cylinder 48 having a ram bar 49 is located on a side of the slide 41, but disposed at a higher level than slide 41, near the rearward end of the stroke of cylinder 42. A receiving container 50 may be positioned below this rearward end of the stroke.

The sequences of operation are as follows. When extruder 10 is started, valve 20 is set so that orifice 27 communicates with cylindrical bore 14 in which piston 15 is being returned by the pressure of the plastic material delivered by the extruder. Obviously, the other orifice 26 of valve 20 is opened to conduit 23. Cylindrical bore 14 thus is being filled with plastic material at low pressure of the extruder. Piston 18 remains during this period in its uppermost position. When bore 14 is filled with plastic material, valve 20 is rotated 90° by hydraulic cylinder 23, so that new orifice 26 communicates with cylindrical bore 14, whereas orifice 27 communicates with conduit 24. Piston 15 now is operated by hydraulic cylinder 16 under full high pressure, that is, in the range of 5,000 p.s.i. for extruding the plastic material into the blow-molding press 25. During this period, extruder 10 keeps operating and feeding, but now is feeding into cylindrical bore 17 under low pressure while piston 18 is being turned by this low pressure of the extruder 10. It becomes immediately evident that no back pressure can be exerted against extruder 10 while the high-pressure operation of extruding the plastic material by piston 15 is being performed.

The operation of filling the low-pressure bore 17 coincides with the extruding stroke of piston 15. When piston 15 reaches its lowest point, valve 20 is switched back by its hydraulic cylinder 23 into starting position as shown in FIGS. 2 and 4. Extruder 10 keeps feeding, but at the same time piston 18, operated by its hydraulic cylinder 19, also discharges the contents of bore 17 under the same low pressure of extruder 10 into the high-pressure bore 14. Again, no back pressure against extruder 10 can occur. During this period of filling of high-pressure bore 14, the blow-molding press performs its operation and thereafter the cycle of operations is repeated.

The blow-molding process is performed in the adjacent molding press 25. Following this process the two side half molds 33, 34 are withdrawn by their corresponding hydraulic cylinders 35, 36 and also the molding head 32 is lifted by its hydraulic cylinder 31. The molded piece remains in upright position on its tail 38. Now, slide 41, with the serrated jaw members 44, 45 is moved forward by its hydraulic cylinder 42 so that the jaws, actuated at or near the end of the stroke, can be closed by their corresponding hydraulic cylinders 46, 47 in order to sharply grip and pinch the tail 38 of the molded piece. When slide 41 with the molded piece 37 now is withdrawn by the rearward stroke of the hydraulic cylinder 42, hydraulically-operated ram bar 49 simply kicks and separates the formed plastic piece from the tail, which drops after re-opening of small cylinders 46, 47 into container 50 for being salvaged, re-ground or re-used, whereas the finished formed plastic pieces may slide or fall into a packaging box or other container (not shown). It is obvious that these operations are performed in timed sequence and in step with the extruding and blow-molding operations so that a highly economical, continuous production is attained.

It is understood that a multiple of pieces may be molded simultaneously, according to the invention.

It is evident that the extruder 10 at no time is subjected to high back-pressure from extruding piston 15 and that the entire mechanism of the device operates smoothly and under low pressures. The disadvantage of having material which is not immediately used, recirculating, is overcome by this invention, as well as the drawbacks of having two alternatingly-operated high-pressure cylinders and a valve operating against high pressure, and having dead spaces in which the usually sensitive plastic material is subject to decomposition while in its heated plastic state.

It also becomes evident that the continuous operation without a "dead time" permits a high and efficient rate of production, although one part of the entire mechanism combination operates reciprocatingly, that is, intermittently, while the other part operates continuously. This is an important feature of the invention.

From the foregoing, it is evident that apparatus, according to the invention, concerns means for forming hollow plastic articles, such as bottles, containers, and other hollow pieces, involving extruding plastic material from a plastic extrusion machine and forming such hollow articles or pieces by blow-molding means; that one of the problems which the present invention overcomes and which distinguishes it from the prior art is that according to the prior art, a reservoir has been provided so that an extruder which delivered plastic continuously could be connected directly to an extrusion orifice which took plastic only intermittently or through a recirculation system, whereas according to the present invention, plastic is extruded through the orifice without setting up an equal back pressure against the extruder screw. Furthermore, according to the present invention, the plastic material does not recirculate, thus distinguishing the same from heretofore known principles and methods of recirculation.

While the invention has been described and illustrated with respect to a certain preferred example which gives satisfactory results, it will be understood by those skilled in the art after understanding the principle of the invention, that various other changes and modifications may be made without departing from the spirit and scope of the invention and it is intended therefore in the appended claims to cover all such changes and modifications.

I claim:

1. A machine for forming hollow plastic articles comprising a continuously operable, relatively low-pressure extruding section, an intermittently operable blow-molding section, an intermittently operable, relatively high-pressure injecting section for feeding pre-heated material received from said extruding section into said blow-molding section, conduits connecting said sections, hydraulically-operated low-pressure means in said injecting section for receiving said pre-heated material from said extruding section, hydraulically-operated high-pressure means in said injecting section for feeding said pre-heated material into said blow-molding section, said high-pressure means being adapted to receive said pre-heated material from said low-pressure means and said extruding section simultaneously, and rotatable valve means arranged in said conduits intermediate said low-pressure section and said high-pressure section, said valve means having a channel having two outlets arranged at a right angle to one another, said low-pressure means, said high-pressure means and said valve means being adapted to cooperate in timed sequence for eliminating back-pressure against said extruding section during the operating phase of said high-pressure means.

2. A machine for forming hollow plastic articles according to claim 1, wherein said blow-molding section is provided with means for delivering said plastic articles, said delivery means comprising reciprocating jaws for gripping the tails of said articles formed in said blow-molding section, and means for separating said articles from said tails.

3. A machine for forming hollow plastic articles comprising a continuously operable, relatively low-pressure extruding section, an intermittently operable blow-molding section, an intermittently operable, relatively high-pressure injecting section for feeding pre-heated material received from said extruding section into said blow-molding section, conduits connecting said sections, hydraulically-operated low-pressure means including a piston in said injection section for receiving said pre-heated material from said extruding section, hydraulically-operated high-pressure means in said injecting section including a piston for feeding said pre-heated material into said blow-molding section, said high-pressure means being adapted to receive said pre-heated material from said low-pressure means and said extruding section simultaneously, and hydraulically-operated rotatable valve means arranged in said conduits intermediate said low-pressure section and said high-pressure section, said valve means having a channel therein arranged perpendicularly to its axis, said channel having two outlets arranged at a right angle to one another, said low-pressure means, said high-pressure means and said valve means being adapted to cooperate in timed sequence for eliminating back-pressure against said extruding section during the operating piston stroke of said high-pressure means.

4. A machine for forming hollow plastic articles according to claim 3, wherein said blow-molding section is provided with means for delivering said plastic articles, said delivery means comprising reciprocating jaws for gripping the tails of said articles formed in said blow-molding section, and means for separating said articles from said tails.

5. In a machine for forming hollow plastic articles having an extruding section for continuous operation at a relatively low pressure, an intermittently operating injecting section feeding pre-heated material received from said extruding section, at relatively high pressure into an intermittently operating blow-molding section, and having interconnecting conduits between said sections, a low-pressure hydraulically-operated piston in said injecting section for receiving said pre-heated material from said extruding section, a high-pressure hydraulically-operated piston in said injecting section for feeding said pre-heated material into said blow-molding section, said high-pressure piston adapted to receive said pre-heated material from said low-pressure piston and said extruding section simultaneously, and a hydraulically-operated rotatable valve arranged in said conduits said valve located between said low-pressure piston and said extruding section, and said high-pressure piston, said valve having a channel therein arranged perpendicularly to its axis, said channel having two outlets arranged at a right angle to one another, said low-pressure piston, said high-pressure piston and said valve being operated in timed sequence for eliminating a high back-pressure against said extruding section during the operating stroke of said high-pressure piston.

6. In a machine for forming hollow plastic articles according to claim 5, wherein said blow-molding section is provided with means for delivering said plastic articles, said delivery means comprising reciprocating jaws for gripping the tails of said articles formed in said blow-molding section, and means for separating said articles from said tails.

7. In a machine for forming hollow plastic articles having a continuously operable extruding section, an intermittently operating injecting section feeding pre-heated material received from the extruding section into an intermittently operating blow-molding machine section and having connecting channels between said sections, the combination of a low-pressure hydraulically-operated piston in said injecting section receiving said pre-heated material from said extruding section, a high-pressure hydraulically-operated piston in said injecting section feeding said pre-heated material into said blow-molding machine section, said high-pressure piston adapted to receive said pre-heated material from said low-pressure piston and said extruding section simultaneously, and a hydraulically-operated rotatable valve located between said low-pressure piston and said high-pressure piston, said valve communicating with said channels between said low-pressure piston and said extruding section in one position thereof and said high-pressure piston in another position thereof, said valve having a channel therein arranged perpendicularly to it axis, said channel having two outlets arranged at a right angle to one another, said low-pressure piston, said high-pressure piston and said valve being operated in timed sequence eliminating a high back-pressure against said extruding section during the operating stroke of said high-pressure piston.

8. In a machine for forming hollow plastic articles according to claim 7, wherein said blow-molding section is provided with means for delivering said plastic articles, said delivery means comprising reciprocating jaws for gripping the tails of said articles formed in said blow-molding section, and means for separating said articles from said tails.

9. A machine for forming hollow plastic articles comprising a continuously operable, relatively low-pressure extruding section, an intermittently operable blow-molding section, an intermittently operable, relatively high-pressure injecting section for feeding pre-heated material received from said extruding section, conduits connecting said sections, low-pressure means in said injecting section for receiving said pre-heated material from said extruding section, high-pressure means in said injecting section for feeding said pre-heated material into said blow-molding section, said high-pressure means being adapted to receive said pre-heated material from said low-pressure means and said extruding section simultaneously, and valve means arranged in said conduits, said valve means located between said low-pressure means and said high-pressure means, said valve means having a channel having two outlets arranged at a right angle to one another, said low-pressure means, said high-pressure means and said valve means being adapted to operate in timed sequence for eliminating back-pressure against said extruding section during the operating phase of said high-pressure means.

10. A machine for forming hollow plastic articles according to claim 9, wherein said blow-molding section is provided with means for delivering said plastic articles, said delivery means comprising reciprocating jaws for gripping the tails of said articles formed in said blow-molding section, and means for separating said articles from said tails.

11. A machine for forming hollow plastic articles according to claim 1, wherein said blow-molding section is provided with means for delivering said plastic articles, said delivering means comprising means for gripping the excess material of said articles formed as a result of said blow-molding operation, and means for separating said articles from said excess material.

12. In a machine for forming hollow plastic articles, according to claim 7, wherein said blow-molding section is provided with means for delivering said plastic articles, said delivering means comprising means for gripping the excess material of said articles formed as a result of said blow-molding operation, and means for separating said articles from said excess material.

References Cited by the Examiner
UNITED STATES PATENTS

| 2,605,948 | 8/1952 | Bridge | 222—444 XR |
| 3,019,480 | 2/1962 | Soubier | 18—5 XR |
| 3,040,376 | 6/1962 | Elphee | 18—5 |
| 3,121,514 | 2/1964 | Kaplan et al. | 222—309 XR |
| 3,127,637 | 4/1964 | Rex | 18—5 |

J. SPENCER OVERHOLSER, *Primary Examiner.*

MICHAEL V. BRINDISI, W. L. McBAY,
*Assistant Examiners.*